Sept. 22, 1970     O. MITCHELL ET AL     3,529,748
DISPENSER FOR PARTIALLY FROZEN CONFECTIONS
Filed April 29, 1968     2 Sheets-Sheet 2
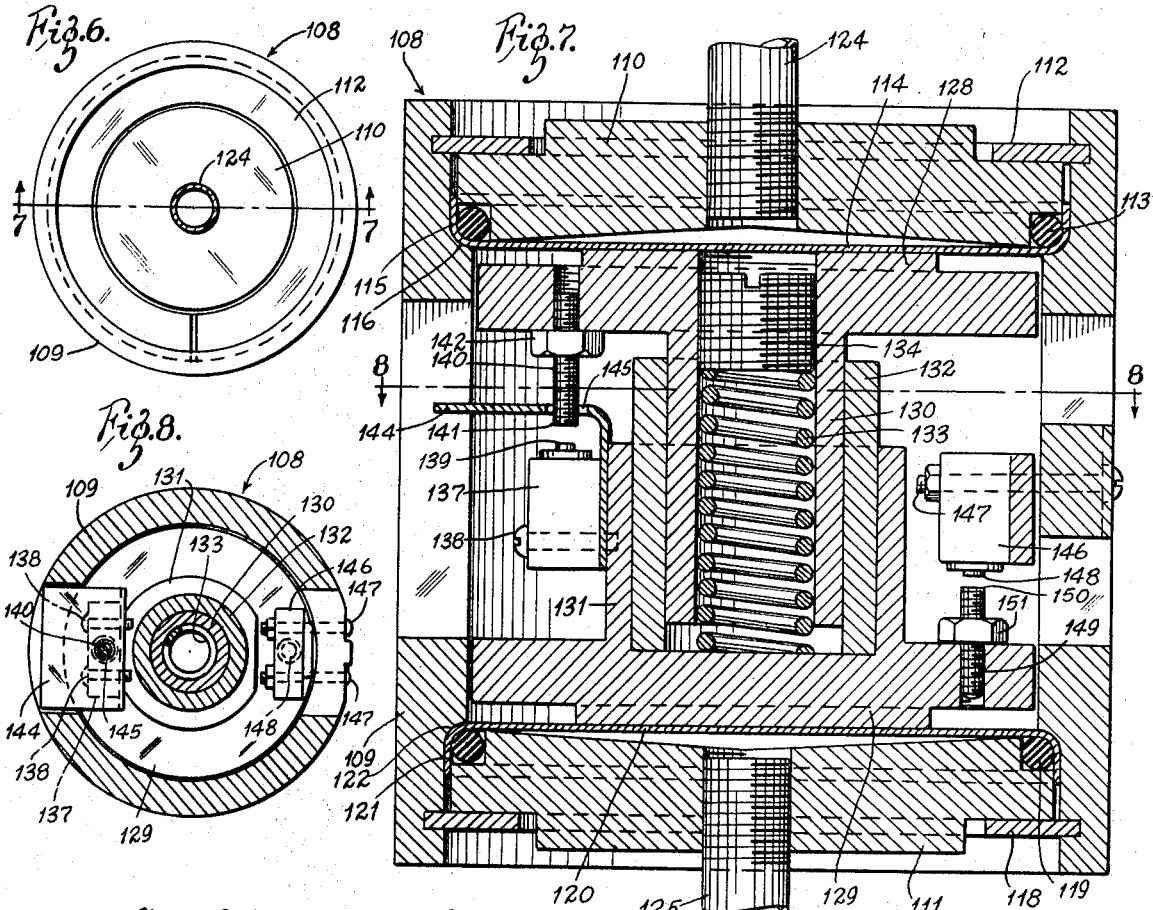
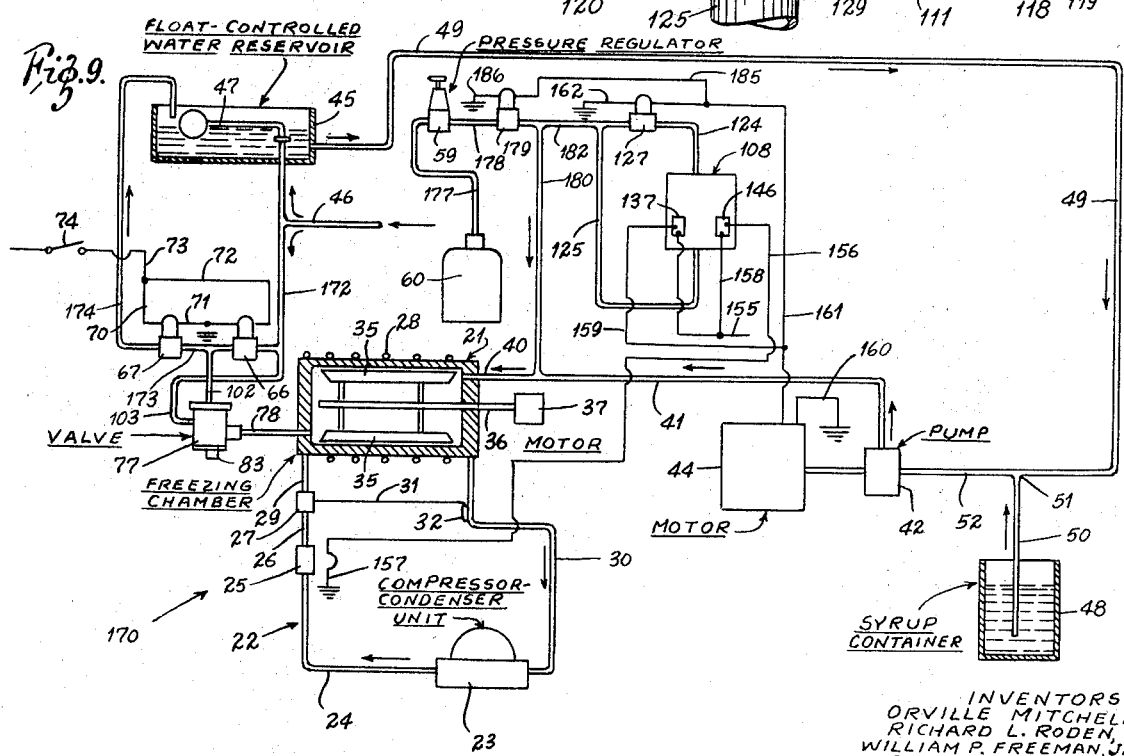
INVENTORS:
ORVILLE MITCHELL,
RICHARD L. RODEN,
WILLIAM P. FREEMAN, JR.
JOHN D. HARRIS,
DUDLEY C. SMITH,
BY Kingsland, Rogers, Ezell, Eilers & Robbins
ATTORNEYS United States Patent Office 3,529,748
Patented Sept. 22, 1970

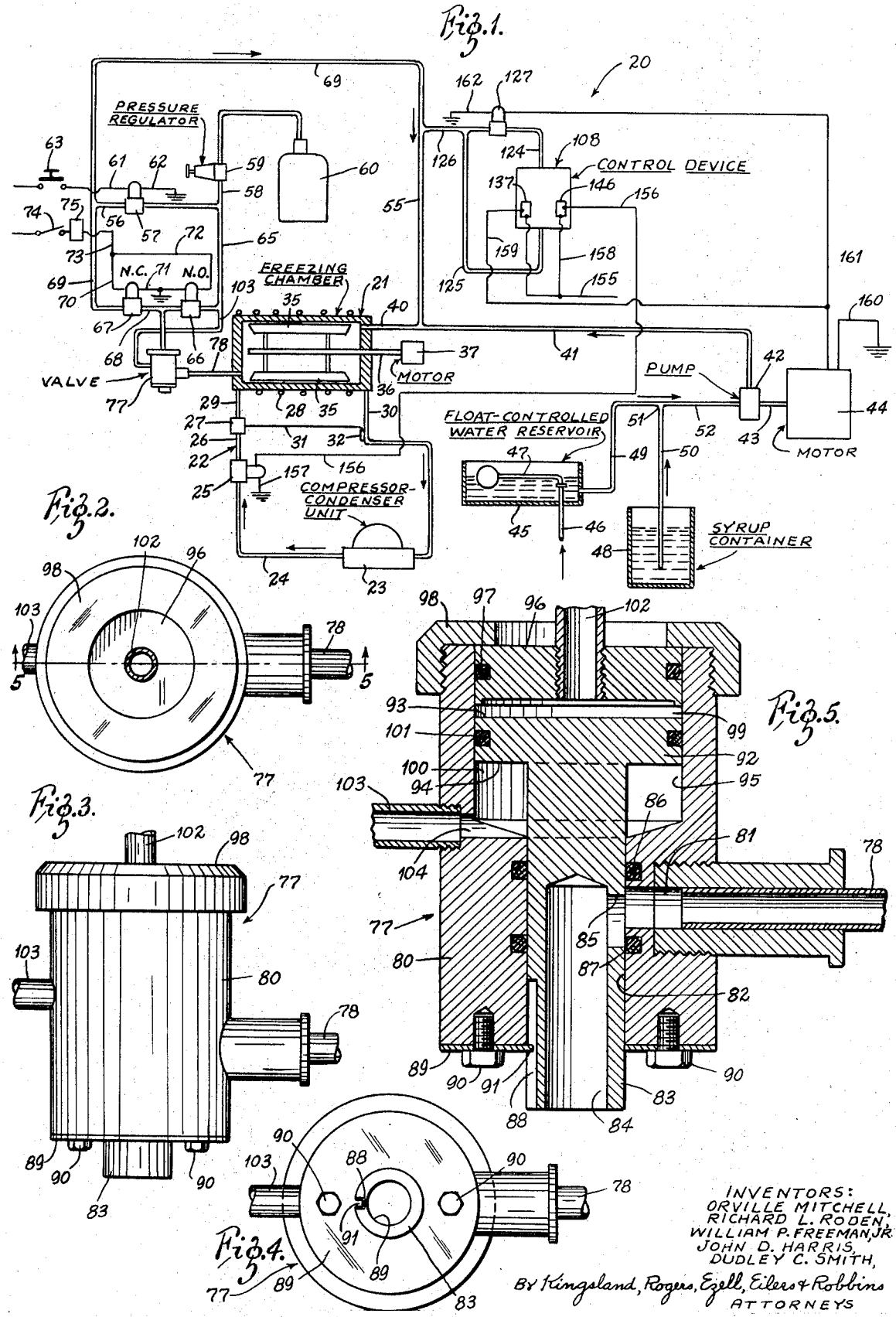

3,529,748
DISPENSER FOR PARTIALLY FROZEN
CONFECTIONS
Orville Mitchell, Richard L. Roden, William P. Freeman, Jr., John D. Harris, and Dudley C. Smith, Dallas, Tex., assignors to John E. Mitchell Company, Dallas, Tex., a corporation of Missouri
Filed Apr. 29, 1968, Ser. No. 724,730
Int. Cl. B67d 5/08
U.S. Cl. 222—54                                    14 Claims

ABSTRACT OF THE DISCLOSURE

A control system for a confection dispenser. A control device regulates refrigeration of the confection in response to variations of pressure within a confection container, and regulates the supply of confection ingredients to the container in response to variations in pressure within the confection container. Operation of a dispensing valve is controlled by sensing the difference in the pressure within the confection ingredients. The dispensing valve can meter the proper replenishment volume of the ingredient which controls the valve.

Control of the refrigeration system and the supply of ingredients to the confection container incorporates some of the concepts set forth in the opening application, Ser. No. 615,722, filed Feb. 13, 1967, and now U.S. Pat. No. 3,403,524, by the same inventors and with the same assignee as this application.

BRIEF DESCRIPTION OF THE INVENTION

In this control system, confection ingredients are supplied to a freezing chamber. A refrigeration system refrigerates the confection ingredients with the chamber. A control device operates in response to the pressure within the freezing chamber to regulate the operation of the refrigeration system and thereby maintain a uniform consistency of the confection product within the chamber.

Confection ingredients comprising water, syrup and carbon dioxide are fed to the freezing chamber by operation of a pump or other means. The control device also regulates operation of the pump or other means in response to pressures within the freezing chamber. Whenever the pressure within the freezing chamber drops, indicating a reduced volume of confection ingredients within the chamber, the control device causes the pump or other means to operate until the pressure again rises. Refrigeration continues during and following filling of the freezing chamber until the confection ingredients have expanded under refrigeration to a higher pressure corresponding to the desired consistency of the confection. This expansion occurs because of the property that water contracts to reduced pressure upon refrigeration to about 36° F. and then expands to higher pressure upon further refrigeration and upon freezing. Since the confection produced by this control system is generally a partially frozen confection formed at temperatures below 32° F., expansion and increase of pressure occurs within the container and is sensed to regulate refrigeration.

A dispensing valve is actuated by movement of a piston to dispense the confection from the freezing chamber. The piston is moved by changes in pressures on its opposite sides. These pressures are, in one embodiment, supplied from the source of carbon dioxide. In another embodiment, these pressures are supplied by the source of water. In each of these embodiments, therefore, the dispensing valve is operated by the pressure of one of the confection ingredients.

BRIEF DESCRIPTION OF THE DRAWINGS

FIG. 1 is a schematic diagram of the system for controlling the production of a confection.
FIG. 2 is a top plan view of the dispensing valve.
FIG. 3 is a side elevation view of the dispensing valve.
FIG. 4 is a bottom view of the dispensing valve.
FIG. 5 is an enlarged view in section taken along the line 5—5 of FIG. 2.
FIG. 6 is a top plan view of the control device.
FIG. 7 is an enlarged view in section taken along the line 7—7 of FIG. 6.
FIG. 8 is a reduced view in section taken along the line 8—8 of FIG. 7.
FIG. 9 is a schematic diagram of a modified system for controlling the production of a confection.

DETAILED DESCRIPTION OF THE INVENTION

In the control system 20 shown in FIG. 1, there is a freezing chamber 21 for receiving confection ingredients and refrigerating them. The freezing chamber 21 is pressure-tight and liquid-tight except for its inlet and outlet which will be described.

The freezing chamber 21 is suitably cooled by a refrigeration system 22 that may comprise a compressor condenser unit 23 having a discharge tube 24 leading to a normally closed solenoid valve 25. Another tube 26 connects the solenoid valve 25 to an expansion valve 27. A cooling coil 28 surrounds or is formed in the body of the freezing chamber 21 and is connected by a tube 29 from the expansion valve 27 and by a tube 30 to the suction side of the condenser unit 23. As is usual, the expansion valve 27 has a capillary tube 31 connected to a bulb 32 to respond to the superheat conditions created by the cooling coil 28.

Within the freezing chamber 21, a plurality of agitator blades 35 are mounted on a shaft 36 driven by a motor 37. The agitator blades 35 continuously revolve in close proximity to the inner wall of the freezing chamber 21 to scrape frozen particles from the inner wall and to mix the product.

Confection ingredients are supplied to the freezing chamber 21 through an inlet tube 40 having a branch 41 connected to the outlet of a pump 42. The pump 42 is connected to the drive shaft 43 of a motor 44. A water reservoir 45 is supplied by water from any source, such as a regular city supply, through an inlet pipe 46. The level of water within the reservoir 45 is controlled by a float valve 47. Syrup is supplied from a syrup container 48. A tube 49 from the water reservoir 45 and a tube 50 from the syrup container 48 meet at a suitable orifice juncture 51 that proportions the relative amounts of water and syrup fed to another tube 52 leading to the suction side of the pump 42.

Another tube 55 branches from the inlet tube 40 to the freezing chamber 41. The tube 55 is joined to a tube 56 in which a normally closed solenoid valve 57 is connected, and the tube 56 is joined to another tube 58 in which a pressure regulator 59 is connected. The tube 58 leads from a carbon dioxide tank 60. The solenoid valve 57 is connected in a circuit (partially illustrated) that includes wires 61 and 62 and a normally open push button switch 63. The closing of the push button switch 63 opens the normally closed solenoid valve 57.

In addition to being connected to the tube 56, the tube 58 is joined to a tube 65 leading to a normally open solenoid valve 66. The solenoid valve 66 is connected to a normally closed solenoid valve 67 by another tube 68. A tube 69 connects the solenoid valve 67 to the tube 55. The solenoid valves 66 and 67 are connected in a circuit (partially shown) that includes wires 70, 71, 72 and 73 and a normally open switch 74. There is also a suitable timer 75 for timing the period during which the circuit is closed following closing the switch 74 and for thereafter opening the circuit. When the switch 74 is closed, the normally open valve 66 closes and the normally closed valve 67 opens. The switch 74 may be a coin controlled switch operated by a suitable coin mechanism (not shown).

As will appear, the valves 66 and 67 control the operation of a dispensing valve 77 which is connected to an outlet tube 78 from the freezing chamber 21.

As shown in FIGS. 2, 3, 4 and 5, the dispensing valve 77 comprises a valve housing or casing 80. The tube 78 leading from the outlet of the freezing chamber 21 is connected to an inlet port 81 in the valve casing 80 that opens into a valve chamber 82. A cylindrical valve member 83 is slidable within the valve chamber 82. The valve member has an internal vertical recess 84 that constitutes the valve outlet. There is a valve port 85 through the side wall of the valve member 83 that is movable into and out of communication with the inlet port 81 depending upon the position of the valve member 83. O-rings 86 and 87 provide fluid seals above and below the inlet port 81. A vertical slot 88 is formed in a side of the member 83, and a plate 89, fastened by bolts 90 to the bottom of the valve casing 80 has a tab 91 extended into the slot 88 to prevent rotation of the valve member 83.

A piston 92 having upper and lower faces 93 and 94 is mounted on the upper end of the valve member 83 and is vertically slidable within a piston chamber 95 formed within the valve casing 80. The upper end of the piston chamber 85 is closed by a stationary plate 96 having a peripheral O-ring 97 to provide a fluid-tight seal. The plate 96 is located by a cap 98 threaded onto the upper end of the casing 80.

The piston 92 separates the chamber 95 into upper and lower sections 99 and 100 which are pressure isolated by an O-ring seal 101. A tube 102 leading from the tube 68 between the solenoid valves 66 and 67 is threaded through the plate 96 and communicates with the upper chamber section 99. Another tube 103 leading from the tube 65 is threaded into the side wall of the valve casing 80, and a port 104 establishes communication between the tube 103 and the lower section 100 of the piston chamber 95.

The refrigeration system 22 and the pump motor 44 are regulated by a control device 108. As shown in FIGS. 6, 7 and 8, the control device 108 has a cylindrical side wall 109 with stationary upper and lower walls 110 and 111. The upper wall 110 is clamped between a lock ring 112 and an O-ring 113. A diaphragm 114 has its outer edge 115 rolled about the O-ring and pressed with the O-ring against an annular shoulder 116 formed in the cylindrical side wall 109. Similarly, the lower wall 111 is clamped between a locking ring 118 and an O-ring 119. A diaphragm 120 has an outer edge 121 that is rolled about the O-ring 119 and is pressed against an annular shoulder 122 in the side wall 109.

A tube 124 is threaded through the upper wall 110 and communicates with the upper side of the diaphragm 114. Another tube 125 is threaded through the lower wall 111 and communicates with the lower side of the diaphragm 120. The tubes 124 and 125 merge in another tube 126 that leads from the tube 55. There is a solenoid valve 127 connected in the tube 124.

Within the cylindrical side wall 109 of the control device 108, a pressure plate 128 bears against the lower side of the upper diaphragm 114. Another pressure plate 129 bears against the upper side of the lower diaphragm 120. The pressure plate 128 has a downwardly extending hollow stem 130, and the pressure plate 129 has an upwardly extending larger diameter hollow stem 131. A cylindrical sleeve 132 is positioned between the stems 130 and 131.

A compression spring 133 is mounted within the sleeve 130 with its lower ends bearing against the pressure plate 129. The upper end of the spring 133 bears against a stud 134 that is threaded into the sleeve 130 and that permits adjustment of the biasing force of the spring 133. The pressure plates 128 and 129 are thus vertically slidable. They are guided by the sleeves 130 and 131 and are biased by the spring 133.

A normally closed micro-switch 137 is mounted by screws 138 to the sleeve 131. The microswitch 137 is actuated by depression of a button 139. A stud 140 that is threaded into the pressure plate 128 has its lower end 141 opposite the button 139 to act as an actuator. The stud 140 is locked in adjustable position by a nut 142. The stem 131 also carries a plate 144 having a hole 145 through it. The stud 140 extends through the hole 145 to prevent relative rotation between the pressure plates 128 and 129.

Another normally closed microswitch 146 is mounted by bolts 147 to the cylindrical side wall 109. The microswitch 146 is operated upon depression of a button 148. A stud 149 is threaded into the pressure plate 129 with its upper end 150 positioned opposite the button 148. The stud 149 is locked in adjustable position by a nut 151 and acts as a switch actuator.

As shown in FIG. 1, the switch 137 is connected to operate the pump motor 44 and the valve 127, with a wire 159 leading to the pump 44 and another wire 160 leading from the pump to ground. A wire 161 connects the wire 159 to the valve 127, and a wire 162 leads from the valve to ground.

The switch 146 is wired to control the solenoid valve 25 with one side of the switch 146 connected to a power conductor 155 by a wire 158 and the other side of the switch connected by a conductor 156 to the solenoid valve 25. A wire 157 leads from the solenoid valve 25 to ground.

OPERATION

To begin, it is assumed there are no ingredients within the chamber 21. Hence, the pressure therein is low. When the operator depresses the push button switch 63, he simultaneously closes a switch (not shown) to close the circuit to the pump motor 44 and solenoid valve 127, across the power supply. Closing of this switch closes the circuit because, since there are no ingredients within the freezing chamber 21, the pressure in that chamber is low. With the low pressure in the chamber 21, the forces above the diaphragm 114 and below the diaphragm 120 in the control device 108 (see FIG. 7) are at minimums, and the pressure plates 128 and 129 are separated by the compression spring 133. This prevents actuation of the normally closed microswitch 137 and therefore lets the motor 44 operate and keeps the normally open valve 127 open. It also keeps the switch actuator 149 from depressing the button 148 of the normally closed microswitch 146 so the circuit to the normally open solenoid valve 127 is closed. Therefore, during filling of the freezing chamber 21, the refrigerator system 22 operates to circulate refrigerant through the cooling coil 28.

As the pump 42 is operated by the motor 44, it draws water from the water reservoir 45 and syrup from the syrup container 48. The water and syrup are merged in proper proportions in the tube 52 by suitable orifices at the juncture 51, and the mixture of water and syrup is pumped into the tube 41. The water and syrup are joined by carbon dioxide entering from the tube 55 by way of the tube 56 and the tube 58. The pressure of the carbon dioxide is controlled by the pressure regulator 59 to a presure that properly proportions the carbon dioxide with the rate of flow of the mixture of water and syrup. The water, syrup, and carbon dioxide flow through the tube 40 into the freezing chamber 41 where they are refrigerated and agitated by the revolving blades 35.

As the freezing chamber 21 fills, the pressure within the chamber increases. This increasing pressure is sensed in the tubes 40 and 55 and in the tube 126. Since the solenoid valve 127 is open, the pressure within the freezing chamber 21 is also sensed in both the tube 124 and the tube 125 and is thereby transmitted to the area above the diaphragm 114 as well as below the diaphragm 120. This increasing pressure against the diaphragm 114 and 120 gradually forces the pressure plates 128 and 129 toward one another against the biasing force of the spring 133. At the same time, however, since the forces above the pressure plate 128 and below the pressure plate 129 are presently equal, the weights of these plates cause them to slide downwardly within the side wall 109 to or near the lower extreme of the plate 129 as determined by the diaphragm 120 and the bottom wall 111, generally as illustrated in FIG. 7. Since the microswitch 146 is mounted directly to the side wall 109 of the housing 108, this gravitational effect on the plates 128 and 129 keeps the actuator 149 from contacting the switch button 148, but, since the increasing pressures above the plate 128 and below the plate 129 cause the plates to continue to move toward one another, the switch actuator 140 gradually approaches the button 139 on the switch 137.

When the pressure within the chamber 21 reaches a predetermined value corresponding to filling of the freezing chamber with confection ingredients, the pressure plates 128 and 129 will have moved together by an amount which presses the switch actuator 140 against the button 139. This opens the microswitch 137 to simultaneously open the circuit to the pump motor 44 and the circuit to the solenoid valve 127. Also, the push button switch 63 should be released. However, since, at this condition, the pressures above and below the pressure plates 128 and 129 are still equal, the plate 129 will have risen very little if at all, because of gravity, and as yet, the switch actuator 149 will not have actuated the switch button 148. Therefore, refrigeration of the confection ingredients within the freezing chamber will continue.

As the refrigeration system 22 continues to operate, the ingredients within the freezing chamber 21 continue to drop in temperature. Because of the special characteristics of water, that it expands upon being cooled below about 38° F., this continued refrigeration of the confection ingredients continues to increase the pressure within the freezing chamber 21.

With further refrigeration of the ingredients within the chamber 21, the ingredients are cooled and begin to freeze into tiny frozen particles. Continued agitation by the revolution of the blades 35 keeps the mixture uniform and prevents unduly large frozen particles from forming on the inner wall of the chamber 21. Also, the increased pressure within the chamber 21 is sensed in the tubes 40, 55 and 126. However, now the solenoid valve 127 is closed, so the increased pressure is sensed only in the tube 125 and not in the tube 124. The pressure in the tube 124 and on the diaphragm 114 remains at the level which existed when the chamber 21 filled and the solenoid valve 127 closed. The increasing pressure is transmitted to the underside of the diaphragm 120 to force the pressure plate 129 upwardly against the biasing force of the spring 133.

At the proper predetermined pressure within the chamber 21, the pressure plate 129 moves upwardly to the point at which the end 150 of the actuator 149 depresses the button 148 of the switch 146. This depression of the button 148 opens the normally closed switch 146 and closes the normally open solenoid valve 125 to stop the flow of refrigerant to the cooling coil 128. Thus the refrigeration of ingredients within the chamber 21 is interrupted when the ingredients have reached the proper and desired consistency. Now the confection is ready for being dispensed.

It will be noted that the actuators 140 and 149 are adjustable and can be locked in selected positions by tightening the nuts 142 and 151. The actuator 140 is adjusted to depress the button 139 and open the switch 137 when the pressure within the chamber 21 reaches about 25 p.s.i., for example, and to release the button and reclose the switch at about 23 p.s.i. This 2 p.s.i. range between actuation and deactuation of the switch is produced by the interval resistance of the switch button 139. Any desired range of actuation and deactuation may be built into the switch design.

The actuator 149 is adjusted to depress the button 148 on the switch 146 when the pressure within the chamber 21 reaches about 26 p.s.i. and to release the button 148 when the pressure drops to about 25½ p.s.i. Thus the refrigeration system 22 always operates to a pressure above until complete filling of the chamber 21 is assured.

Until a drink or confection is to be dispensed, the switch 74 remains open, keeping the solenoid valve 66 open and the solenoid valve 67 closed. Therefore, carbon dioxide pressure from the tube 65 as determined by the pressure regulator 59 is transmitted through the tube 102 to the section 99 of the piston chamber 95 above the piston 92 and through the tube 103 to the section 100 of the piston chamber 95 below the piston 92. Since the area of the upper face 93 of the piston 92 exposed to the piston chamber section 99 is larger than the area of the lower face 94 of the piston 92 exposed to the chamber section 100, the equal pressures above and below the piston 92 produce a net downward force driving the piston 92 to its lower extreme. This moves the valve member 83 downwardly, moving the valve port 85 below the O-ring 87 and away from communication with the inlet port 81. The piston 92, valve member 83, and valve port 85 will remain in these positions so long as the pressures above and below the piston 92 remains equal.

The dispensing valve 77 is operated upon closing the switch 74. The switch 74 may be a coin controlled switch which is closed by the deposit of a proper coin. Closure of the switch 74 causes the circuit to the solenoid valves 66 and 67 to be closed for a period determined by the timer 75.

When the circuit to the solenoid valves 66 and 67 is closed, the normally opened valve 66 closes and the normally closed valve 67 opens. Closure of the valve 66 breaks communication between the tube 102 and the source of carbon dioxide, and opening of the valve 67 establishes communication between the tube 102 and the tubes 69, 55 and 40 to expose the piston section chamber 99 to the pressure within the freezing chamber 21. Since the pressure within the freezing chamber 21 is always below the pressure within the tube 58 leading from the carbon dioxide tank 60, the pressure above the piston 92 is now reduced. However, the tube 103 remains in communication with the tubes 65 and 58 and, therefore, the pressure below the piston 92 remains at the higher pressure determined by the pressure regulator 59. This produces a net upward force driving the piston 92 to its upper extreme and moving the valve member 84 upwardly to put the valve port 85 in communication with the inlet port 81.

The pressure within the freezing chamber 21 causes confection to be discharged through the tube 78 in the inlet port 81 and through the valve port 85 to the outlet 84. As the confection is discharged through the valve port 85, it strikes the opposing wall of the outlet passage 84, producing some decarbonation, and also reducing the discharge velocity so that the product falls by gravity into a vessel held below the outlet 84.

When the dispensing valve 87 has been opened for the proper duration as determined by the timer, the circuit to the solenoid valves 66 and 67 opens, opening the valve 66 and closing the valve 67. This re-establishes communication between the tube 102 and the tube 65 and again equalizes pressures above and below the piston 92, driving the piston downwardly and closing the valve.

Each time the piston 92 is driven downwardly by the net downward force of carbon dioxide pressure, the carbon dioxide fills the section 99 of the piston chamber 95 above the chamber 94. Thereafter, each time the valve 66 closes and the valve 67 opens upon closing the circuit to these valves, the piston 92 is driven upwardly, and the carbon dioxide that occupied the upper chamber section 99 is driven through the tubes 102, 69, 55 and 40 into the freezing chamber 21. The size and stroke of the piston 92 and the area of the piston chamber 95 can be established to replenish a proper volume of carbon dioxide to the freezing chamber upon each dispensing of a confection. This proper volume of carbon dioxide is determined in relation to the time during which the dispensing valve 77 is opened and the volume of confection that is dispensed during each dispensing operation.

Each time confection is dispensed from the freezing chamber 21, the pressure within the chamber is reduced. This reduced pressure is initially sensed only in the area below the diaphragm 120, since the solenoid valve 127 remains closed. The reduced pressure below the diaphragm 120 permits the pressure plate 129 to lower somewhat under the force of the biasing spring 133. When the pressure plate 129 falls sufficiently to release the button 148, the circuit to the refrigeration system 22 is again opened, opening the solenoid valve 25 and permitting refrigerant to flow to the cooling coil 28.

Usually, when a drink or confection is dispensed, the pressure within the freezing chamber 21 is reduced sufficiently to cause the pressure plate 129 to be driven downwardly by the spring 133 and lower the microswitch 137 sufficiently to break contact with the switch actuator 140. This again energizes the pump motor 44 and opens the solenoid valve 127 to replenish confection ingredients to the freezing chamber 21 and again equalize pressures above the diaphragm 114 and below the diaphragm 120. Confection ingredients will be supplied to the freezing chamber until the pressure reaches a level to again close the microswitch 137. Refrigeration continues until the microswitch 146 is again actuated. These operations are as already described.

Thus, this system uses the carbon dioxide pressure to control the operation of the dispensing valve 77. Also, the dispensing valve 77 controls the volume of carbon dioxide that replaces each volume of confection dispensed. The control system also regulates the supply of confection ingredients to the freezing chamber in response to the pressure within the freezing chamber and it controls the operation of the refrigeration system in response to the pressure within the freezing chamber. The system automatically maintains a uniform desired consistency of the confection product.

Also, it will be noted that, although the O-ring seals 86 and 87 provide substantial resistance to sliding the valve member 83, the carbon dioxide supply provides adequate pressure to operate the piston member 92 and thereby operate the valve 77. In spite of these high pressures, the controlling solenoid valves 66 and 67 may be small and low powered.

DESCRIPTION OF THE EMBODIMENT OF FIG. 9

The system 20 of FIG. 1 is particularly suitable for a machine that dispenses constant volumes of confection since the volume of replenishing carbon dioxide supplied to the freezing chamber 21 is related to the volume of confection dispensed. FIG. 9 illustrates a control system 170 having universal application for dispensing various volumes of confection as may be required to fill cups of various sizes.

In this control system 170, many of the same components are used as described with FIG. 1, and, for those components, similar reference characters are reapplied. In this control system 170, the dispensing valve 77 is operated by water circulation rather than by the circulation of carbon dioxide. The water reservoir 45 is supplied with water from a pressure source, such as city water supply, to the pipe 46 as controlled by the float valve 47. Water from the reservoir 45 is delivered through the tube 49 to the orifice juncture 51 where the water is joined with syrup flowing in the tube 50 from the syrup container 48 to be pumped to the freezing chamber 21. There is another branch tube 172 that delivers water from the pressure source to the valve 66.

A pipe 173 connects the valves 66 and 67, and another pipe 174 is connected from the valve 67 as a return to the water reservoir 45.

The carbon dioxide tank 60 has a tube 177 connected to its outlet to deliver carbon dioxide through the pressure regulator 59 to another tube 178. The tube 178 leads to a solenoid valve 179, and a tube 180 connected from the solenoid valve is joined to the tube 41. When the solenoid valve 179 is opened, carbon dioxide can flow from the tank 60 through the tubes 177, 178 and 180 to be mixed with water and syrup flowing in the tube 41 and the mixture of carbon dioxide, water, and syrup flows through the tube 40 to the freezing chamber 21.

Another tube 182 leads from the tube 180 through the solenoid valve 127 to the tube 124. The tube 125 is also joined to the tube 182.

The tube 102 that leads to the section 99 of the piston chamber 95 is connected to the tube 173 between the valves 66 and 67. The tube 103 that leads from the section 100 of the piston chamber 95 is joined to the tube 172.

The wiring for the control system 170 is as described for the control system 20 with an additional wire 185 connected from the wire 161 to the solenoid valve 179. Another wire 186 is connected from the valve 179 to ground.

OPERATION OF THE CONTROL SYSTEM OF FIG. 9

To fill the freezing chamber 21, the circuit to the motor 44, the control device 108, and the valves 127 and 179 is closed by closing a suitable switch (not shown). At this time, circuit will be closed because the pressure within the freezing chamber 21 is low and the microswitch 137 is in its "on" condition. As the pump 42 operates, it draws water from the water reservoir 45 and syrup from the syrup container 48 into the tube 52. The water and syrup are mixed in the proper proportions at the orifice juncture 51. The carbon dioxide is supplied under pressure from the tank 60 through the pressure regulator 59 and the solenoid valve 179 to the tube 180. The solenoid valve 179 has a suitable orifice (not shown) for regulating the rate of flow of carbon dioxide for proper proportioning with the syrup and water in the tube 41. The mixture of water, syrup and carbon dioxide flows through the tube 40 to the freezing chamber 21.

The proper volume of confection ingredients and the operation of the refrigeration system 22 is regulated by the control device 108 as has already been described. The only difference is that, whenever the switch 137 opens to open the circuit to the pump motor 44 and the solenoid valve 127, it also opens the circuit to the normally closed solenoid valve 179 to close that valve.

The dispenser valve 77 has the construction illustrated in FIG. 5, although dimensions may vary. The operation of the dispenser valve 77 is as described in connection with the control system 20 except that, instead of being operated by carbon dioxide pressures on opposite sides of the piston 92, the valve is operated by water pressures supplied through the tube 46. The supply of these water pressures is controlled by the solenoid valves 66 and 67 as has been described. In this control system 170, however, the switch 74 is a manually controlled switch that is held closed for the proper duration to dispense the volume of confection required by the size container held below the outlet from the dispensing valve 77.

Various changes and modifications may be made within the purview of this invention as will be readily apparent to those skilled in the art. Such changes and modifications are within the scope and teaching of this invention as defined by the claims appended hereto.

What is claimed is:

1. A control system for a confection dispensing machine of the kind having a chamber for receiving confection ingredients, means to supply confection ingredients to the chamber, means for refrigerating the ingredients within the container, and means to discharge confection from the container, comprising means to control operation of the refrigerating means in response to pressure conditions caused by temperature variations within the chamber and to control operation of the confection supply means in response to pressure conditions within the chamber.

2. The control system of claim 1 wherein the control means comprises movable wall means movable in response to pressure changes caused by variations in volume of ingredients within the chamber and movable in response to pressure changes caused by variation in temperature of the ingredients within the container, actuator means for controlling operation of the confection supply means according to predetermined positions of the wall means, and actuator means for controlling operation of the refrigeration means in response to other predetermined positions of the wall means.

3. The control system of claim 2 wherein each actuator means comprises a switch.

4. The system of claim 1 wherein the control means comprises a wall means, means movably supporting the movable wall means, means biasing the movable wall means in one direction, means for exposing the side of the movable wall means opposite the biasing means to pressure within the chamber, a first switch in the path of the movable wall means for controlling operation of the confection supply means, and a second switch in the path of the movable wall means for controlling operation of the refrigerating means.

5. Apparatus for controlling the consistency of a confection comprising a closed container for receiving confection ingredients, means to supply ingredients to the container, means to refrigerate the ingredients within the container, means to discharge confection from the container, movable wall means movable in response to pressure variations within the chamber to control operation of the supply means, means responsive to movement of the movable wall means to a predetermined position for isolating pressure against one side of the movable wall means corresponding to the pressure representing capacity content of ingredients within the container, and means responsive to further movement of the movable wall means with changes in pressure on another side of the movable wall means representing changes in temperature of the ingredients within the container to control operation of the refrigerating means.

6. The apparatus of claim 5 wherein the movable wall means comprises separate walls, and means biasing the wall apart.

7. The apparatus of claim 5 wherein the discharge means comprises a dispensing valve, and piston means movable in response to the ingredients comprising water, syrup, and carbon dioxide, difference between the pressure in the container and the pressure of the supply source of one of the ingredients.

8. The apparatus of claim 7 wherein the said one ingredient is carbon dioxide.

9. The apparatus of claim 7 wherein the said one ingredient is water.

10. The apparatus of claim 7 wherein the dispensing valve comprises a valve casing, a piston slidable within the casing, the piston having first and second opposed faces, the area of the first face being greater than the area of the second face, means for exposing one face of the piston to the source of one of the ingredients, means for selectively exposing the other face of the piston alternately to the source of one of the ingredients and to the pressure within the container, and a valve member movable in response to movements of the piston to alternately block and unblock discharge of the confection.

11. The apparatus of claim 10 wherein the said one ingredient is carbon dioxide, the piston being slidable within a chamber, and means to deliver carbon dioxide from the said chamber to the container upon each dispensing operation.

12. The apparatus of claim 11 wherein the chamber is sized to replenish a volume of carbon dioxide to the container substantially equal to the volume of carbon dioxide dispensed with the confection.

13. A confection dispenser comprising a confection chamber for containing a confection that includes water, carbon dioxide, and syrup, a source of water, a source of carbon dioxide, a source of syrup, means to deliver water, carbon dioxide and syrup to the confection chamber, means to refrigerate the water, carbon dioxide and syrup in the confection chamber, a dispensing valve having a valve member movable to discharge confection from the confection chamber, the dispensing water comprising a valve casing, a pressure chamber within the casing, a wall movably supported within the pressure chamber, the wall having first and second sides dividing the pressure chamber into first and second sections, means exposing the first side of the wall to the pressure at the source of one of the confection ingredients, means to alternately expose the second side of the wall to the pressure at the source of the said one ingredient and to the pressure within the confection chamber, to move the movable wall, the latter two pressures being different, the areas of the first and second sides of the wall being different, the valve member being movable in response to movements of the movable wall to alternately block and unblock discharge of confection from the confection chamber.

14. The confection dispenser of claim 13 wherein the said one ingredient comprises carbon dioxide, tube means to connect the carbon dioxide source to the said first section of the chamber, tube means to connect the first section of the pressure chamber to the confection chamber, and means for blocking the last named tube means when the dispenser valve member is in position to block discharge of confection from the confection chamber.

References Cited

UNITED STATES PATENTS

| | | | |
|---|---|---|---|
| 2,760,344 | 8/1956 | Oltz | 62—136 |
| 3,298,190 | 1/1967 | Harker | 62—136 |

STANLEY H. TOLLBERG, Primary Examiner

U.S. Cl. X.R.

62—136